US007391535B2

(12) United States Patent
Jacobsen

(10) Patent No.: US 7,391,535 B2

(45) Date of Patent: Jun. 24, 2008

(54) RASTER IMAGE PROCESSING

(75) Inventor: Dana A. Jacobsen, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 875 days.

(21) Appl. No.: 10/643,020

(22) Filed: Aug. 18, 2003

(65) Prior Publication Data

US 2005/0041264 A1 Feb. 24, 2005

(51) Int. Cl.
*H04N 1/40* (2006.01)
*H04N 1/00* (2006.01)

(52) U.S. Cl. .................................... 358/1.9; 358/426.02

(58) Field of Classification Search .................. 358/1.9, 358/2.1, 426.02–426.08, 539, 1.2
See application file for complete search history.

(56) References Cited

U.S. PATENT DOCUMENTS 5,272,543 A * 12/1993 Yanagisawa ................ 358/403
5,465,165 A * 11/1995 Tanio et al. ................. 358/448
5,611,024 A * 3/1997 Campbell et al. .......... 358/1.15
6,999,203 B1 * 2/2006 Kim .......................... 358/3.12

FOREIGN PATENT DOCUMENTS

JP 09216349 A * 8/1997
JP H11196279 6/1998
JP 2000299863 10/2000

OTHER PUBLICATIONS

Japanese Patent Office Notice of Rejection, Pat. 2004235047, Oct. 25, 2006,5 pgs.

* cited by examiner

*Primary Examiner*—Thomas D Lee
*Assistant Examiner*—Stephen M. Brinich

(57) ABSTRACT

In one embodiment, a raster image processor, which may be part of a printing device or configured as a separate device, includes a processor to parse a print ready file, a rasterizer to translate the parsed print ready file to an intermediate file, and a compressor to translate the intermediate file to an embedded bit-stream.

16 Claims, 7 Drawing Sheets

RASTER IMAGE PROCESSING

TECHNICAL FIELD

The present disclosure relates to document printing, and more particularly but without limitation, the use of embedded bit-stream compressors in printers.

BACKGROUND

A typical printing environment includes a source or host device such as a computer. The source device provides image or object information data to a printing device. The printing device may include a laser printer, an ink-jet printer, a thermal printer, a facsimile device, and/or a copier.

In a typical printing process, the source device or computer generates a print ready file through an application such as Photo-Paint® by the Corel Corporation or Photo Shop® by the Adobe Corporation, often in combination with a printer driver. The print ready file defines a printed page using a page description language (PDL). Examples of PDLs include Post-script® by the Adobe Corporation and printer command language (PCL®) by the Hewlett-Packard Corporation. The print ready file, also known as a PDL file, describes a page's margins and spacing; placement of graphics; margins and spacing; fonts and text; and shading and colors.

In certain applications, a raster image processor (RIP) device or a language parser receives the PDL file. The RIP device or language parser typically is part of the printing device. The RIP device or language parser may include a processor and memory. The processor receives the PDL file and processes the PDL file to construct a page image. The page image is stored in the memory of the RIP device or language parser. The complexity of the PDL file as well as the characteristics of the print engine determines the processor and memory requirements. Some printers, particularly low memory laser printers, employ a technique known as "racing" to avoid storing the entire page image at once.

The page image is fed to a print engine, where the print engine physically images the page onto media such as a sheet. A page description typically is built in two steps. First, during formatting by the RIP or language parser, the PDL file is converted into a series of commands called display commands which describe what must be printed. The display commands for a printing device typically include such objects as color commands that describe a particular color that is to be printed, vectors that indicate position on the media sheet, the color to be rendered, raster images, and font glyphs. Second, the display commands are sorted according to their vertical position on the page and are assigned to "page strips." Each page strip stores the display commands in a "display list." Although horizontal strips are discussed, other page tiling techniques can be used.

After display lists have been created for every page strip, the page strips are ready to be rasterized and passed to a print engine. At such time, the page strips are processed, typically but not limited to, in the order in which they will be sent to the print engine. For each page strip, the commands on the display list are parsed and sent to the rasterization module. At this point the rasterized strip may be sent to the print engine for immediate printing, or may be compressed and stored for later printing. The operation used by some printing technologies (e.g. laser printers) is such that each page strip must arrive in a very narrow time window from the previous page strip. Therefore compression of page strips is typically performed, with later decompression and printing of all page strips. This reduces the time dependency to the decompression of a fixed size page strip rather than the rasterization of an arbitrarily complex display list. Compression condenses the page strips into more manageable streams of information. Typically, lossy compression is used, where portions of the information contained in the page strips are lost during compression. Lossy compression algorithms used for images are generally visually lossless. In other words, the user does not notice a degraded image caused by loss of certain data. Unfortunately, in other cases, the degradation of a reproduced image using a lossy compression algorithm is quite noticeable. With usual lossy compression algorithms this typically occurs when very high compression ratios are used to store the image in very little memory.

The compressed page strip is then compared to a threshold to determine whether the compressed page strip fits in available resources. If the compressed page strip does not fit, it is "recompressed." Recompression involves decompressing the page strip, then compressing the page strip using a lower quality level. The recompression process repeats until the threshold is met. At a later point in the rendering of a page, limited printer resources (e.g., memory) may require saving space. If space must be saved, recompression of one or more of the page strips must take place. Recompression of all page strips is often desirable to assure that all page strips have the same quality level.

Recompressing which involves decompressing then compressing takes a relatively long time. In addition, lossy compressing using lower quality levels drops data, resulting in degraded images. To avoid recompression, often a printer is set up for a low threshold value. This way the chances are higher the image will fit under the threshold and avoid running out of memory later. In many instances the threshold value is set lower than necessary, resulting in a lower quality page than could have been printed.

Therefore, there is a need to process page strips and render a page, without the need to continually perform recompression when printer resources such as memory are low, and provide the best quality image with the resources provided by the printer.

BRIEF DESCRIPTION OF THE DRAWINGS

The same reference numbers are used throughout the drawings to reference like components and features.

DETAILED DESCRIPTION

Overview

The following discussion is directed to a system and methods for using embedded bit-streams representing intermediate images such as page strips. An embedded bit-stream compressor receives and processes intermediate images. Advantages of the disclosed system and methods include significant time savings in printing an image and printing the highest quality image possible in respect to the available resources of a printing device.

Exemplary Environment

Figure 1:
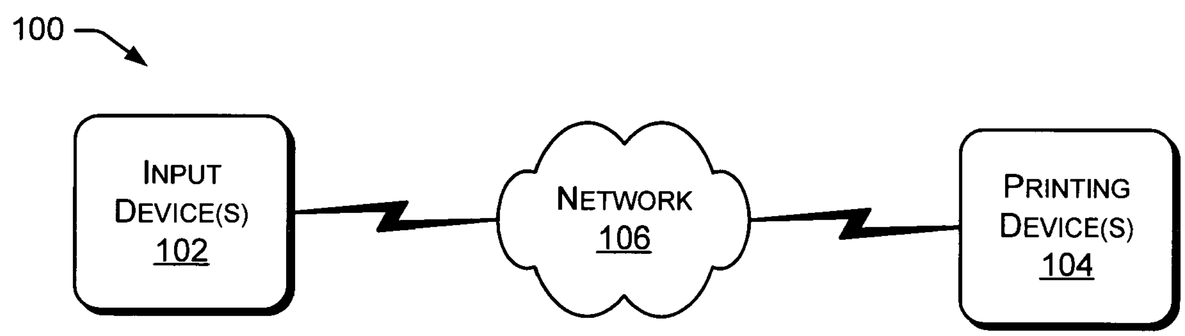
FIG. 1 is a diagram illustrating an exemplary system environment suitable for implementing various methods that make use of printing devices with embedded bit-streams.

FIG. 1 shows an exemplary system environment 100 suitable for implementing various methods that make use of embedded bit-streams. The exemplary environment 100 includes input device(s) 102 and printing device(s) 104 operatively coupled through a network 106. The network 106 can include both local and remote connections depending on the particular system configuration. Thus, network 106 may include, for example, a printer cable, a LAN (local area network), a WAN (wide area network), an intranet, the Internet, or any other suitable communication link. Network connection 106 might also include a wireless communications link such as an IR (infrared) or RF (radio frequency) link.

Input device(s) 102 can be implemented as a variety of general purpose computing devices including, for example, a personal computer (PC), a laptop computer, a handheld PDA (e.g., Palmtop®, PalmPilot®), a Macintosh®, a workstation computer, and other devices configured to communicate with printing device(s) 104. An input device 102 typically provides a user with the ability to manipulate or otherwise prepare in electronic form, an image or document that can be printed or otherwise formed in hardcopy on a print medium by a printing device 104 after transmission over network 106.

In general, an input device 102 outputs formatted print data to a printing device 104 which converts the data and outputs it onto an appropriate recording media, such as paper or transparencies. Print data from input device 102 is generally formatted by a printer driver into a PDL (page description language) file format, such as PCL® (Printer Control Language) or PostScript, suitable for printing device 104, prior to being sent to printing device 104.

Printing device(s) 104 can be implemented as various types of printers capable of rendering PDL data in printed form on a print medium, such as printing pixels on paper. Therefore, printing device(s) 104 can include devices such as laser-based printers, ink-based printers, dot matrix printers, dry medium printers, plotters and the like. In addition, printing device(s) 104 might also include various multi-function peripheral (MFP) devices that combine a printing function with other functions such as facsimile transmission, scanning, copying and the like.

Exemplary Hardware/Software Architecture

Figure 2:
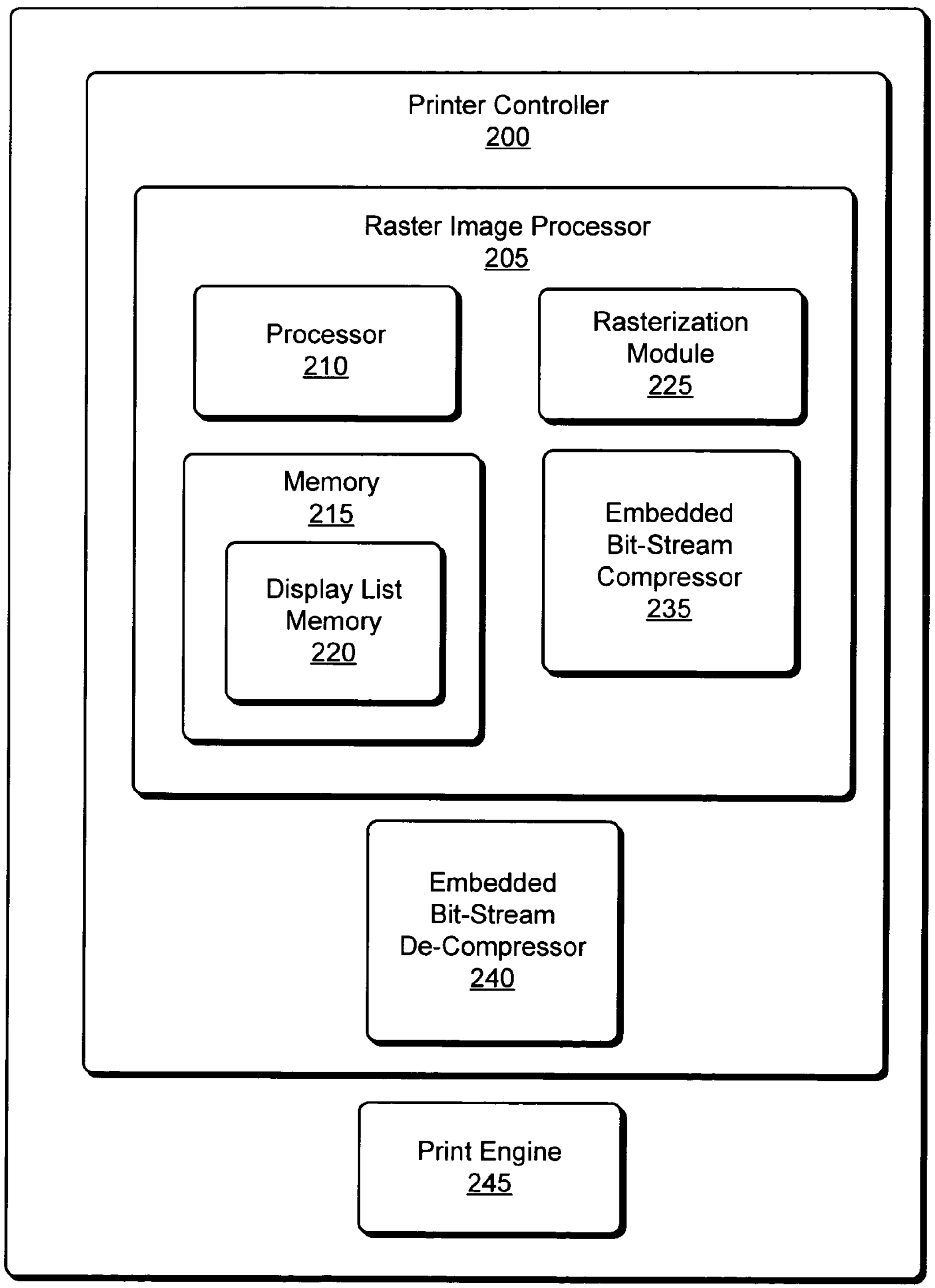
FIG. 2 is a block diagram illustrating an exemplary embodiment of a printing device as might be implemented in the exemplary system environment.

FIG. 2 illustrates an exemplary embodiment of a printing device 104 as might be implemented in the system environment 100 of FIG. 1. Printing device 104 includes a printer controller 200 that receives, processes, and sends information from and to various devices (modules) within and external to printing device 104.

In this example, printer controller 200 includes a raster image processor (RIP) 205. In other cases, RIP 205 is a separate device from printer device 104 and printer controller 200. In those particular cases, RIP 205 is considered a host device that provides functionality to one or more printing devices. The functionality of RIP 205 is discussed in detail below.

A print ready file may include a display list, and may be described as a PDL file. The PDL file is sent to printing device 104 and received by RIP 205. RIP 205 includes a processor 210 and RIP memory 215. RIP memory 215 includes a display list memory 220 that stores a created display list. In other embodiments, a language parser may be used in place of RIP device 205. Essentially, RIP 205 or a language parser parses PDL file drawing commands that describe complex objects on a page into display list commands that describe less complex objects within a page strip that may be considered as an "intermediate" file or image. Parsing may be performed by processor 210. After display lists have been created for every page strip, the page strips (i.e., intermediate files) are parsed and sent to a rasterizer or rasterization module 225. Although page strips are described, all intermediate images (files) are contemplated to be able to make use of the described systems and methods.

The rasterized page strips, also known as "raster data", are then compressed by embedded bit-stream compressor 235. Embedded bit-stream compressor 235 may make use of one of several known compression algorithms that use embedded bit-streams. The embedded bit-stream (i.e., compressed raster data) may be stored in a storage medium such as memory 220.

In cases where RIP 205 is a separate host device, the embedded bit-stream is sent from RIP 205 or directly from embedded bit-stream compressor 235 to one or more printing devices. In this example, the compressed raster data are sent to an embedded bit-stream de-compressor 240. The compressed raster data are uncompressed by embedded bit-stream de-compressor 240 prior to sending them to print engine 245 since print engine 245 may only receive uncompressed raster data. Print engine 245 typically is hardware that performs rendering of an image, and marking on a physical media.

Exemplary Methods

Compression algorithms, such as the Joint Photographic Experts Group (JPEG) 2000, Embedded Zerotree Wavelet (EZW), Said & Pearlman's (S&P) wavelet compression, and Set Partitioning In Hierarchical Trees (SPIHT), make use of embedded bit-streams. An embedded bit-stream of an image is one in which the optimal bit-stream (per a given coding scheme) for any length "N" is contained in a prefix of any bit-steam of length "M," where M>=N. In other words, all lower quality images are contained within (i.e., embedded in) any higher quality image. In general, each successive bit that is added to a bit-stream adds additional information that provides a higher quality image. "Quality" is a vague and subjective concept, and these algorithms allow the use of a quality metric and attempt to perform the task of defining lower quality images within higher quality images. Additionally, while few algorithms are able to get down to the individual bit level and may instead have a granularity of bytes, words, or other small packet sizes, the concept of embedding lower quality images into higher quality images is followed. Any embedded compression technique may be applied. Additionally, the concept applies to progressive encoding techniques such as the interlaced method of the Graphics Interchange Format (GIF), the progressive encoding provided by the Joint Photographic Experts Group (JPEG), or various resolution pyramid techniques.

Figure 3:
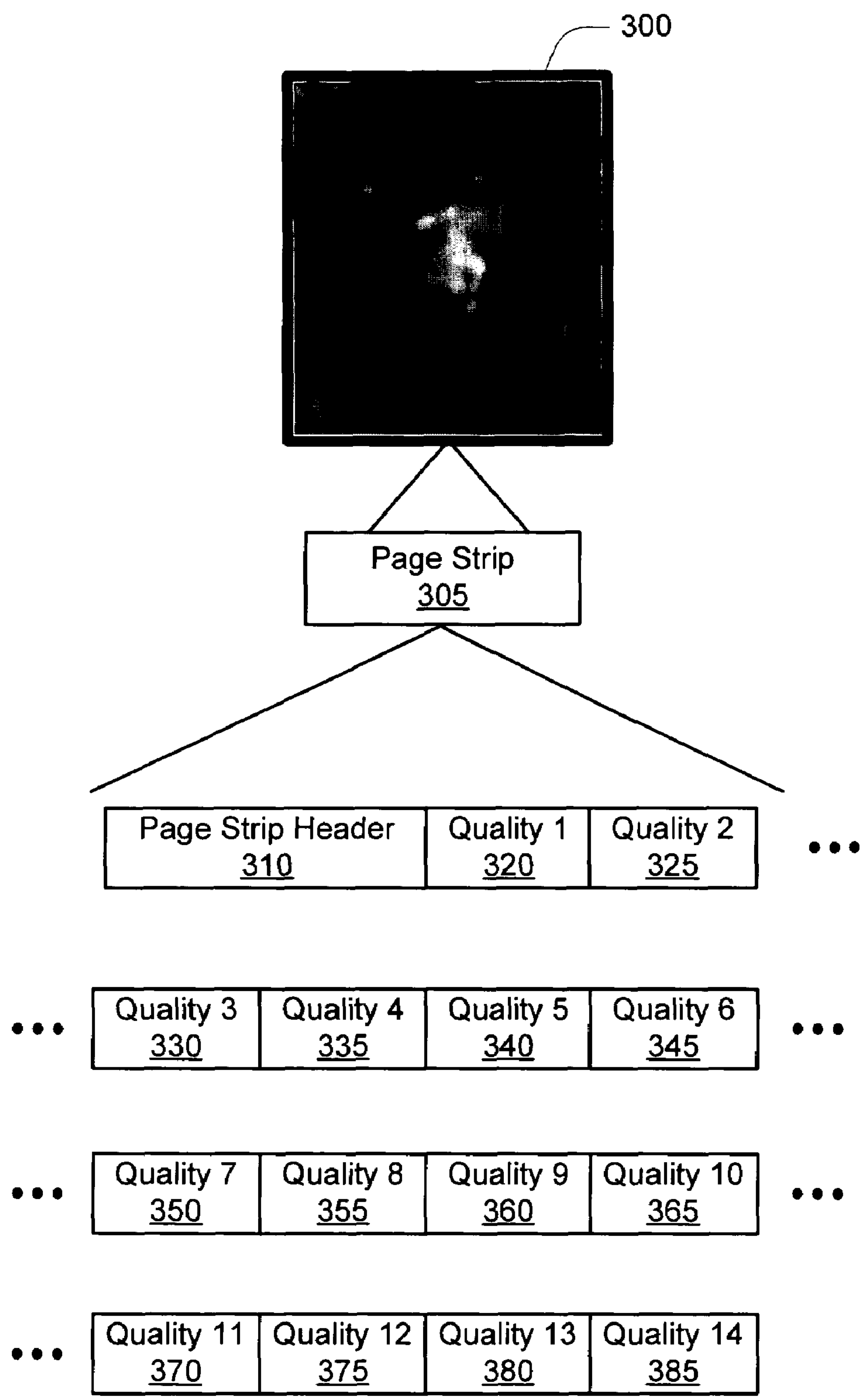
FIG. 3 is a diagram illustrating a coded image-chain for a particular page strip.

FIG. 3 illustrates a coded image-chain for a particular page strip. It is contemplated that all page strips will be described with image-chains with this same format. Lengths of images-chains vary among page strips, since page strips vary in complexity. The longer the image-chain, the more complex is the page strip. An image-chain is described as an example; however, it is contemplated that other embedded bit-stream formats may be used. Blocks within each chain may be sized uniformly or non-uniformly, and may be sized differently based on the characteristics of the printer, either statically (i.e., at boot time) or dynamically (i.e., while the printer is running). Additionally, certain progressive compression techniques may not allow arbitrary block sizes but have requirements on block sizes dependant upon source image dimensions, source image data, or a particular compression method. In general, blocks will be uniformly sized to fit hardware and memory requirements (e.g. blocks may be sized between 8 kilobytes and 64 kilobytes).

In this example, an image 300 is described by a page strip 305. Page strip 305 in turn is described by a coded image-chain that includes a page strip header 310 and a string of quality blocks “quality 1” 320 to “quality 14” 385. Quality blocks provide additional information to succeeding quality blocks. Accumulated quality blocks define an image. The more quality blocks that are accumulated, the greater is the image quality. Page strip header 310 contains related information that describes the relationship of the quality blocks that make up the image-chain. Header 310 may further contain unspecified contents describing the chain such as related pointer information regarding addressable points to devices (e.g., printers). The image-chain of page strip 305 includes quality blocks that represent quality information. In this particular example, fourteen quality blocks are provided. Other page strips may require fewer or more quality blocks. For page strip 305 the following quality blocks are provided: “quality 1” block 320 provides a first level image quality; “quality 2” block 325 provides a second level image quality; “quality 3” block 330 provides a third level image quality; “quality 4” block 335 provides a fourth level image quality; “quality 5” block 340 provides a fifth level image quality; “quality 6” block 345 provides a sixth level image quality; “quality 7” block 350 provides a seventh level image quality; “quality 8” block 355 provides an eighth level image quality; “quality 9” block 360 provides a ninth level image quality; “quality 10” block 365 provides a tenth level image quality; “quality 11” block 370 provides an eleventh level image quality; “quality 12” block 375 provides a twelfth level image quality; “quality 13” block 380 provides a thirteenth level image quality; and “quality 14” block 385 provides a fourteenth level image quality.

In this example, quality blocks are described. However, as discussed, other formats for embedded bit-streams may be used, which include formats that may include quality blocks or provide for information in a format other than quality blocks or blocks. It is also possible for an implementation to dispense with the header 310 and use a different technique to link the blocks, such as chaining.

“Quality 1” block 320 provides the minimum resolution (quality) possible for the page strip. “Quality 1” block 320 may include a highly reduced number of pixels and a minimized palette of colors or shades, or the low frequency components of the image. If only “Quality 1” block 320 is received, the worst image resolution is seen. However, if an embedded encoder is used, this is the highest quality image that can be displayed with this amount of data (using the given compression technique and quality metric). “Quality 2” block 325 adds to image quality by providing additional image information, where the information may include additional pixels, additional palettes of colors or shades, and/or higher frequency image data. Quality blocks 330, 335, 340, 345, 350, 355, 360, 365, 370, 375, 380, and 385 are received in order and progressively added to the image quality of page strip 305. The quality of an image represented by page strip 305 depends on the number of quality blocks that are received. For example, if quality blocks 320, 325, and 330 are received and used, a certain quality image is made available. A higher quality image is made available if block 335 is received and used. A lower quality image is available if only blocks 320 and 325 are received and used.

During receipt, and in particular during compression, of the stream of blocks of page strip 305, truncation of quality blocks may take place. In other words, not all of the quality blocks may be received. Unless it is imperative to have the highest quality resolution possible, in most instances, receiving a certain truncated string of quality blocks is acceptable.

Figure 4:
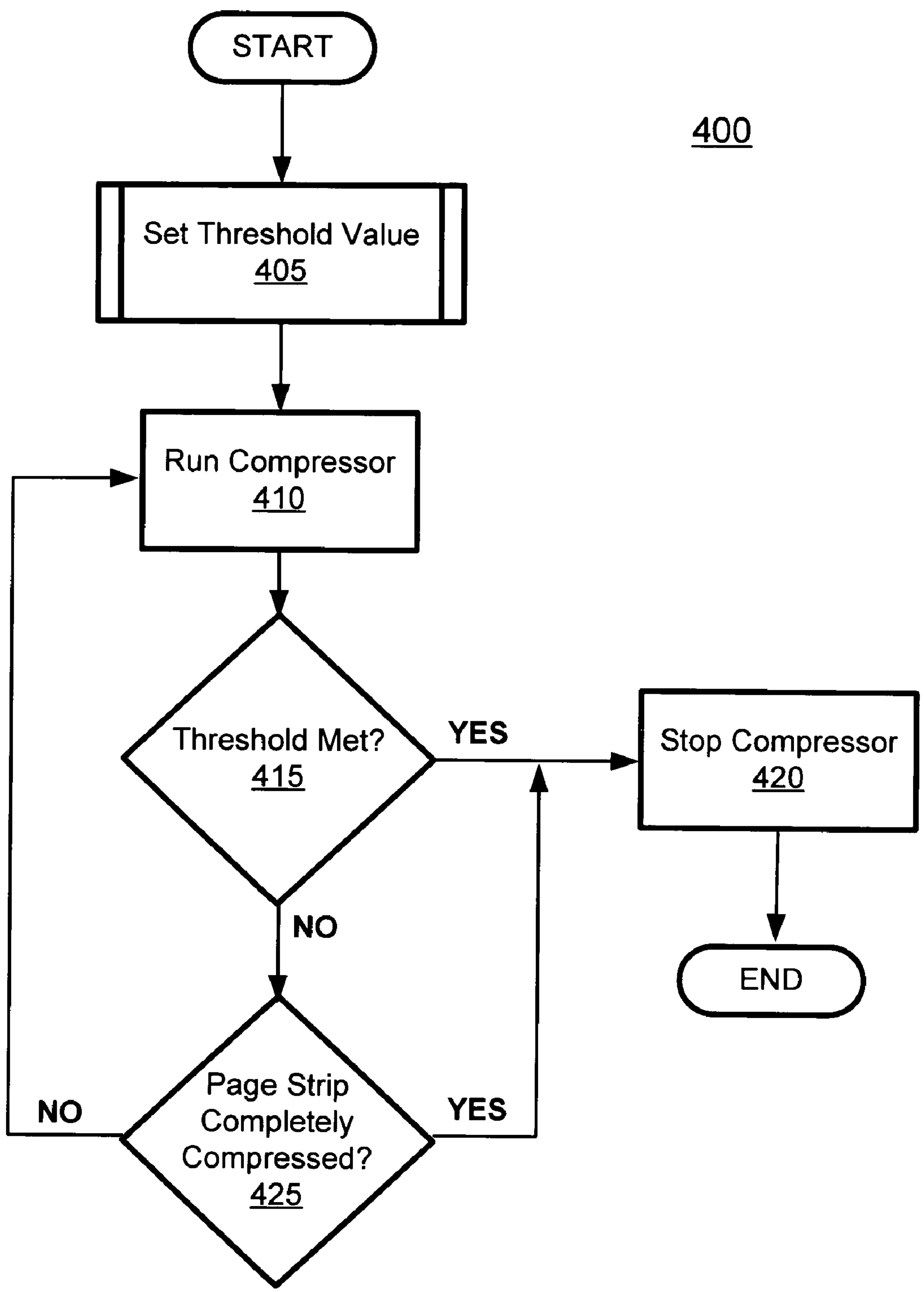
FIG. 4 is a flowchart diagram illustrating an exemplary method of initial compression of a page strip.

FIG. 4 illustrates an exemplary process 400 of initial compression of a page strip or intermediate file. Process 400 is described using “page strip”; however, it is contemplated that other intermediate files or images may make use of process 400 as discussed above. Memory resources are allocated in blocks having specific size limitations, for example 8 kilobytes to 64 kilobytes. Page strips are compressed and placed into the allocated memory blocks. A predetermined threshold value may be set for each printing device, operation 405. The threshold value typically is based on printing device resources or capabilities, or a large enough threshold value which is known to achieve acceptable quality in all practical instances. The threshold value should be set as high as the resources of the printing device will allow. It is not necessary to set the threshold value to a low value in anticipation of the size of the page strips to avoid recompression. It is also possible to adjust the threshold value dynamically as the page strips are processed such that if previous page strips compressed well, then further strips receive a higher threshold value. This allows better quality over the page, while limiting the compressed size of all page strips on a page to achieve a threshold size.

As initial page strips are received by the printer controller 210 of FIG. 2, the printer controller 210 may compress the page strips by running the embedded bit-stream compressor 235 of FIG. 2, operation 410. The embedded bit-stream compressor 235 processes each page strip into an image-chain format such as illustrated in FIG. 3. While the embedded bit-stream compressor 235 processes each page strip, the threshold value may be reached. A determination is made whether the threshold value has been reached, operation 415. If the threshold value is reached, compression for the particular page strip is stopped, operation 420. The created image-chain for the particular page strip contains all quality blocks up to when the threshold value is reached. In certain cases, a page strip is allowed to be completely compressed (i.e., all quality blocks are received). This results in lossless encoding (i.e., all image information is received). A determination is made if a page strip is completely compressed, operation 425. If the page strip is completely compressed, the embedded bit-stream compressor 235 is stopped for that particular page strip, operation 420. If the particular page strip is not completely compressed, the embedded bit-stream compressor 235 continues to process the page strip, operation 410. Since blocks are being used, it would be usual to fill a whole block with data even if the threshold has been met earlier in the block, hence threshold decision 415 is typically run after a block has been filled. However, if block truncation is allowed as a means of recovering memory, then there may be cases where it is useful to not fill a complete block.

As discussed above, there may be instances where resources, such as memory, need to be freed up. Instead of going through a recompression of all the page strips, quality blocks from image-chains may be dropped. To assure consistency of the page strips, in particular the image-chains representing the page strips, quality blocks are dropped using a defined method. Several methods allow for quality blocks to be dropped from image-chains that result in consistent printed images. Note that the last block from a given chain is the only block under consideration for being dropped. Blocks from the middle of a chain cannot be dropped since this would result in an invalid compressed image. The methods described show how the selection is made of which strip or strips will have the last block dropped from. Additionally, while reference is made to dropping blocks, other techniques including reallocation of the last block to one of a smaller size is possible. By using blocks the size can be quickly and efficiently trimmed with no memory bandwidth consumed, and this method applies to a wide variety of compression techniques.

Figure 5:
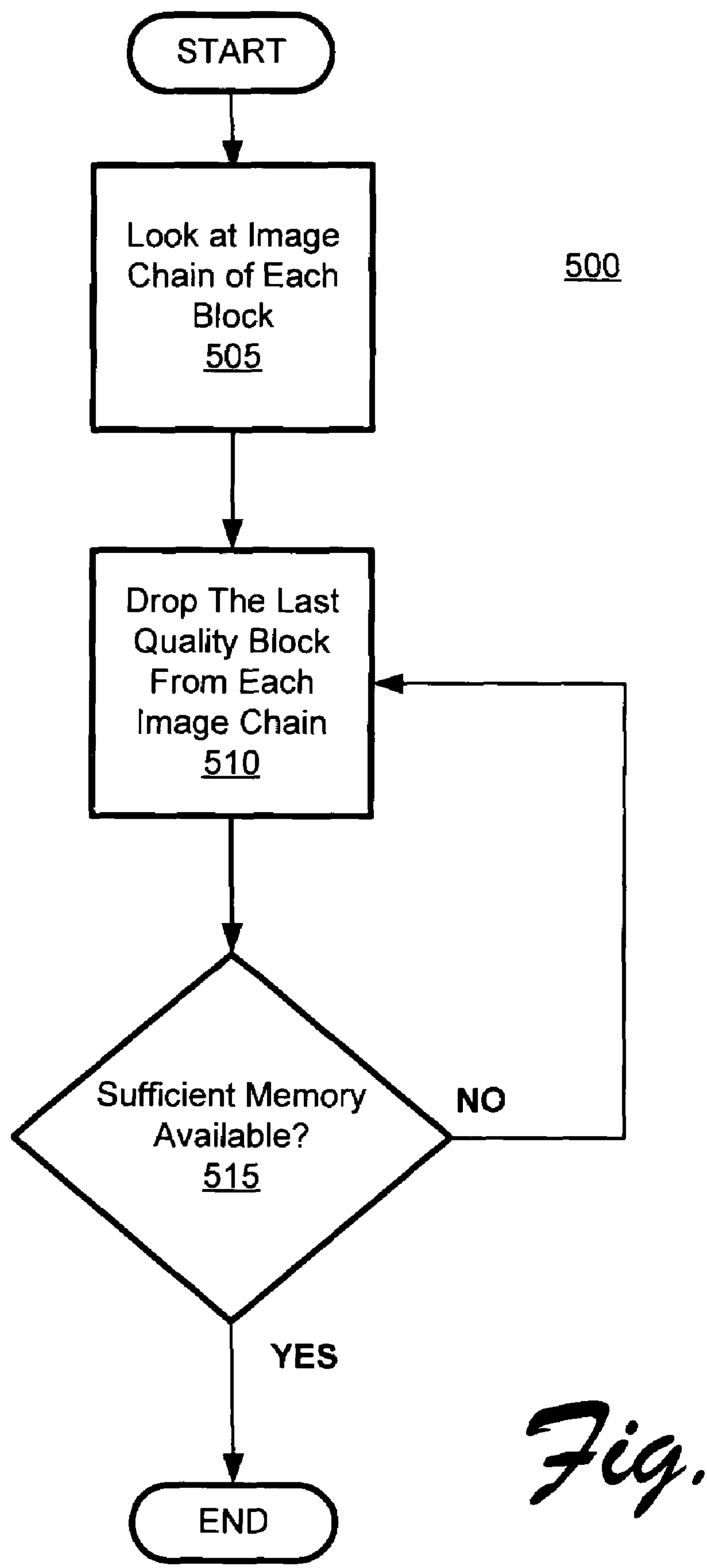
FIG. 5 is a flowchart diagram illustrating a process to drop quality blocks from each image-chain.

FIG. 5 shows a process 500 to drop quality blocks from each image-chain. Each of the image-chains of the page strips is looked at, operation 505. In order to free up resources (memory) the last quality block from all image-chains are indiscriminately dropped, operation 510. Operation 515 determines if resources (memory) have sufficiently been made available. If more resources (memory) need to be freed, operation 510 continues dropping the last block from each of the image-chains.

Figure 6:
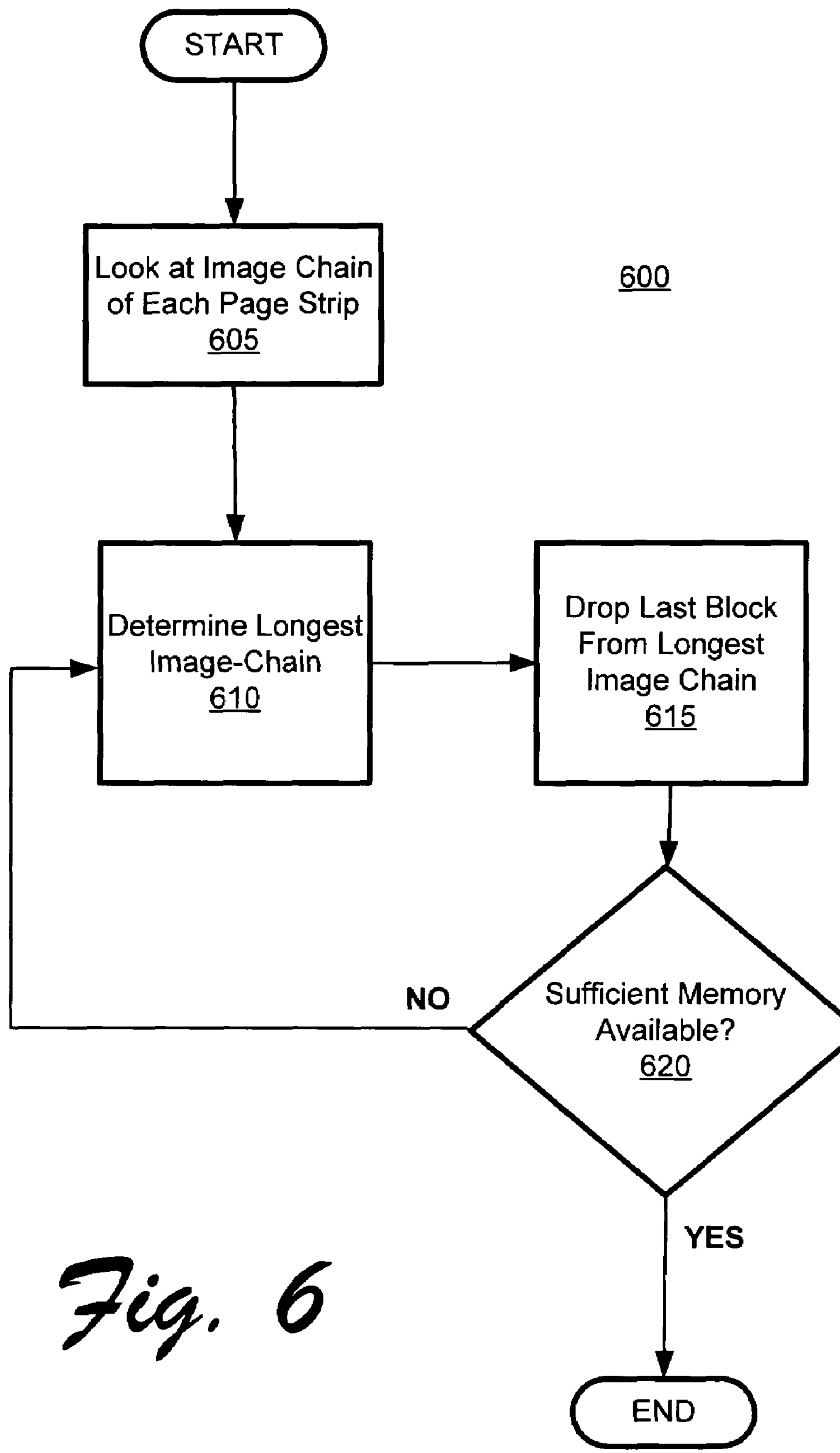
FIG. 6 is a flowchart diagram illustrating a process to drop quality blocks from the longest image-chains.

FIG. 6 shows a process 600 to drop quality blocks from the longest image-chains. Each of the image-chains of the page strips is looked at, operation 605. A determination is made as to the longest image-chain, operation 610. Operation 615 drops the last quality block from the longest image-chain in order to free up resources (memory). Operation 620 determines if resources (memory) have sufficiently been made available. If sufficient resources (memory) have been made available by dropping the last quality block from the longest image-chain, there is no further need to drop quality blocks. If additional resources (memory) need to be freed up, operation 610 looks at the current longest image-chain, and operation 615 drops the last quality block from that image-chain.

Figure 7:
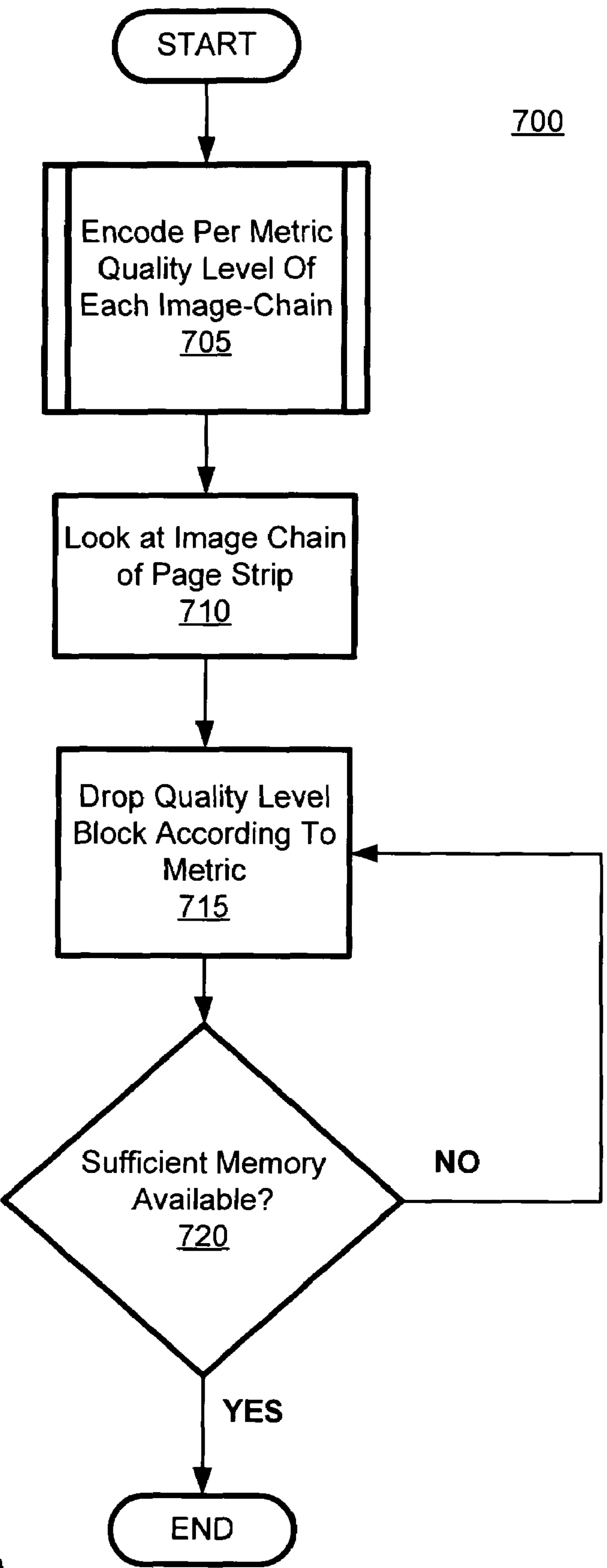
FIG. 7 is a flowchart diagram illustrating a process to drop quality blocks from image-chains based on a predetermined metric assigned to quality blocks.

FIG. 7 shows a process 700 to drop quality blocks from image-chains based on a predetermined metric assigned to quality blocks. In certain cases, quality blocks in an image-chain may provide more or less significant image quality information, regardless of where the particular quality block is on the image-chain. In these cases, the quality blocks of the image-chains may be encoded with a predetermined metric, operation 705. One such metric that may be used is assigning Peak Signal-to-Noise Ratio (PSNR) values to each quality block. As an example, PSNR values allow an assignment of quality based on original image and reconstructed image, with higher PSNR values reflecting better image reconstruction. Therefore, quality blocks that have PSNR values (or other metric) that contribute the least to the sub-image block are dropped first.

Each of the image-chains of the page strips is looked at, operation 710. Depending on the assigned metric, quality blocks are dropped from image-chains regardless of which image-chains the quality blocks are part of, operation 715. For example, if using PSNR as a metric, quality blocks with PSNR values that contribute the least to image reconstruction are dropped first.

Operation 720 determines if resources (memory) have sufficiently been made available. If sufficient resources (memory) have been made available by dropping a particular quality block based on the predetermined metric, there is no further need to drop quality blocks. If additional resources (memory) need to be freed up, operation 715 is performed to drop quality blocks based on the predetermined metric.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A method of compressing print data comprising:
- determining a threshold of a printing device resource;
- receiving an intermediate image file;
- translating the intermediate image file to data described by a progressive encoding technique; and
- selectively dropping quality information from the data when the threshold of the printing device resource is met;
- wherein the data described by the progressive encoding technique comprises embedded bit-streams.

2. The method of claim 1, wherein dropping quality information is performed by dropping a quality block from each of the embedded bit-streams when the threshold of the printing device resource is met.

3. The method of claim 1, wherein dropping quality information is performed by dropping a quality block from a longest embedded bit-stream of the embedded bit-streams when the threshold of the printing device resource is met.

4. The method of claim 1, wherein dropping quality information is performed by dropping a quality block based on a predetermined metric from each of the embedded bit-streams when the threshold of the printing device resource is met.

5. The method of claim 1, wherein the intermediate image file comprises a page strip.

6. The method of claim 1, wherein the embedded bit-streams comprise an image chain.

7. A method of compressing print data comprising:
- determining a threshold of a printing device resource;
- receiving an intermediate image file;
- translating the intermediate image file to data described by a progressive encoding technique;
- selectively dropping quality information from the data when the threshold of a the printing device resource is met; and
- completing translating the intermediate file when the threshold of the printing device resource is met.

8. An embedded bit-stream compressor comprising:
- means for receiving an intermediate image file;
- means for translating the intermediate image file to embedded bit-streams;
- means for selectively dropping quality information from the embedded bit-streams when a predetermined threshold of a printing device resource is met.

9. The embedded bit-stream compressor of claim 8 wherein the means for translating the intermediate image file includes a means for completing translating when the predetermined threshold of the printing device resource is met.

10. The embedded bit-stream compressor of claim 8 further comprising means for storing the embedded bit-streams to a recordable medium.

11. A computer program product encoded in computer readable media, comprising:
- a first set of instructions, executable on a computer system, configured to receive an intermediate image file;
- a second set of instructions, executable on the computer system, configured to translate the intermediate image file to embedded bit-streams; and
- a third set of instructions, executable on the computer system, configured to drop quality information from the embedded bit-streams when a predetermined threshold of a printing device resource is met.

12. The computer program product of claim 11 further comprising:
- a fourth set of instructions, executable on the computer system, configured to store the embedded bit-streams on recordable media.

13. The computer program product of claim 11, wherein the second set of instructions translates the intermediate file when the predetermined threshold of the printing device resource is met.

14. The computer program product of claim 11, wherein the third set of instructions drop quality by dropping a portion of quality information from each of the embedded bit-streams when the predetermined threshold of the printing device is met.

15. The computer program product of claim 11, wherein the third set of instructions drop quality information by dropping a portion of quality information from a longest embedded bit-stream of the embedded bit-streams when the predetermined threshold of the printing device is met.

16. The computer program product of claim 11, wherein the third set of instructions drop quality information by dropping a portion of quality information based on a predetermined metric from each of the embedded bit-streams when the predetermined threshold of the printing device is met.

* * * * *

UNITED STATES PATENT AND TRADEMARK OFFICE

CERTIFICATE OF CORRECTION

PATENT NO. : 7,391,535 B2
APPLICATION NO. : 10/643020
DATED : June 24, 2008
INVENTOR(S) : Dana A. Jacobsen It is certified that error appears in the above-identified patent and that said Letters Patent is hereby corrected as shown below:

In column 8, line 34, in Claim 7, after "of" delete "a".

In column 8, line 52, in Claim 11, after "product" insert -- , --.

Signed and Sealed this

Second Day of December, 2008

JON W. DUDAS
*Director of the United States Patent and Trademark Office*